April 29, 1958 H. T. LYMAN 2,832,891

WIDE RANGE RADIO FREQUENCY TUNER

Filed June 21, 1954 2 Sheets-Sheet 1

Inventor
Harold T. Lyman
By Toma, McDougall, Williams & Hersh
Att'ys

April 29, 1958 H. T. LYMAN 2,832,891

WIDE RANGE RADIO FREQUENCY TUNER

Filed June 21, 1954 2 Sheets-Sheet 2

Inventor
Harold T. Lyman
By Dome, McDougall, Williams & Hersh
Att'ys

United States Patent Office 2,832,891

Patented Apr. 29, 1958

2,832,891

WIDE RANGE RADIO FREQUENCY TUNER

Harold T. Lyman, Milford, Conn., assignor to Aladdin Industries, Incorporated, Nashville, Tenn., a corporation of Illinois Application June 21, 1954, Serial No. 438,043

4 Claims. (Cl. 250—40)

This invention relates to radio frequency tuners particularly those adapted to cover extremely wide frequency ranges at very high and ultra-high frequencies.

One principal object of the invention is to provide an improved wide range radio frequency tuner which will cover an extremely wide frequency range without the necessity for any band switching.

A further object is to provide a radio frequency tuner of the foregoing character which will cover a wide frequency range with a minimum of mechanical movement.

Another object is to provide an improved radio frequency tuner in which relative movement is effected between a coil and energy transfer element in order to vary the effective inductance of the coil.

It is a further object of the invention to provide an improved tuner which affords smooth frequency variation and does not produce electrical noise due to variation of the tuner.

Another object is to provide an improved wide range radio frequency tuner of the foregoing character which is low in cost and simple in construction.

Other objects and advantages of the invention will appear from the following description, taken with the accompanying drawing, in which.

Figure 1:
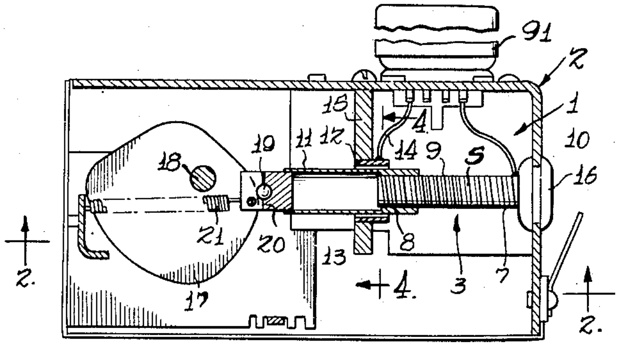
Figure 1 is an elevational sectional view of an illustrative embodiment of the invention in the form of a wide range radio frequency tuner, the view being taken generally along a line 1—1 in Fig. 2.
Figure 2:
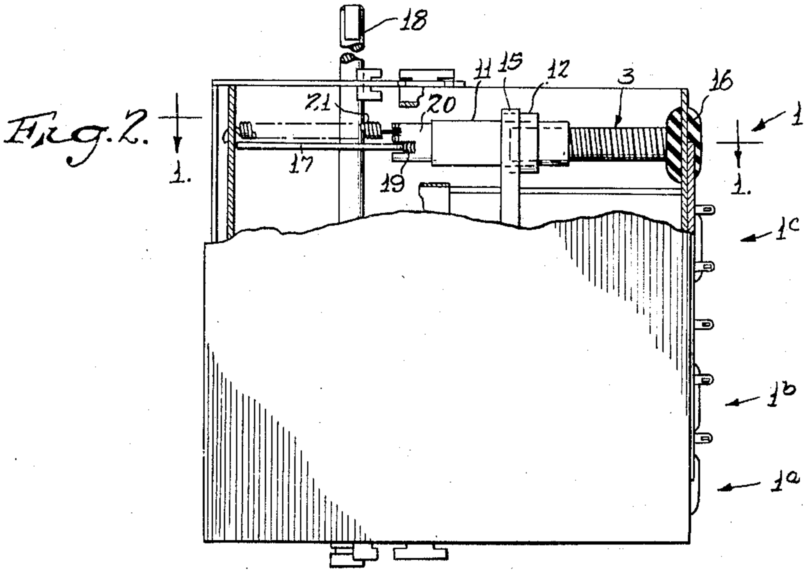
Fig. 2 is a bottom plan view, partly in section, generally along a line 2—2 in Fig. 1.
Figure 3:
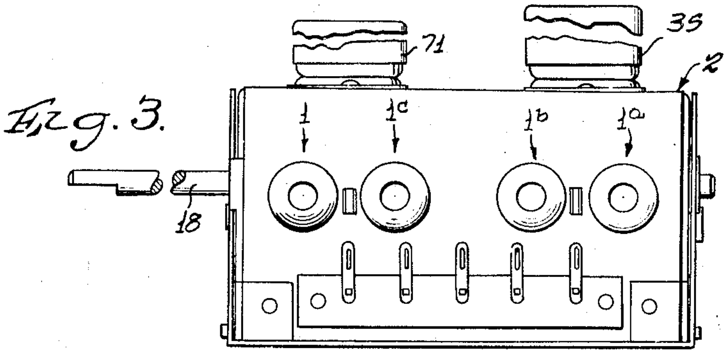
Fig. 3 is an end elevational view of the exemplary tuner.
Figure 6:
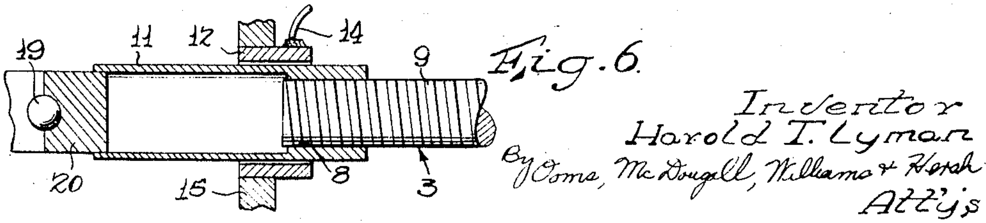
Fig. 6 is an enlarged fragmentary sectional view of the tuner of Fig. 1.

Considered in greater detail, Fig. 1 of the drawings discloses a purely illustrative wide range radio frequency tuner 1 embodied in a superheterodyne converter unit 2 for use with a radio or television receiver for very high or ultra-high frequencies. Three other similar tuners 1*a*, 1*b*, and 1*c* may also be embodied in the converter 2. The converter 2 may be arranged to cover any suitable frequency range, such as the commercial television channels between 54 and 216 megacycles, for example.

Figures 4, 5:
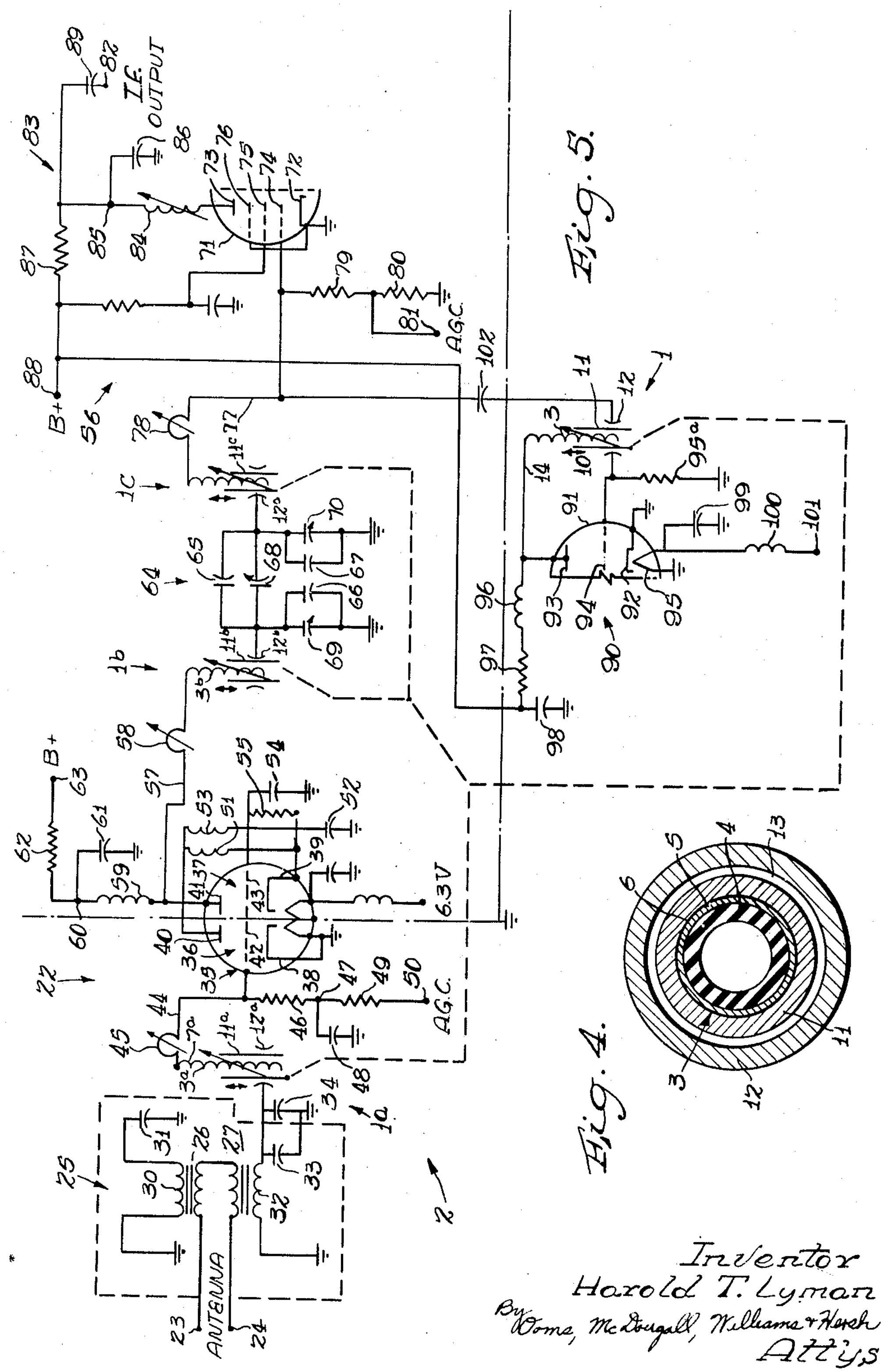
Fig. 4 is an enlarged fragmentary sectional view taken generally along a line 4—4 in Fig. 1.
Fig. 5 is a schematic diagram of the superheterodyne converter utilizing four of the tuners of Fig. 1.

The illustrated tuner is provided with a generally helical coil 3 formed or wound on an insulating cylindrical form or support 4 (Fig. 4). The coil 3 may comprise a conductive ribbon or film 5 carried on the form 4 and covered with an insulating, protective layer or film 6 of low loss dielectric material, the film being so thin as to be transparent. While it is possible to form the helical ribbon 5 by winding a strip of metal on the form 4, it generally is more advantageous to form the ribbon 5 by printed circuit or related techniques.

Although the coil 3 may be formed with substantially uniform inductance per unit length, it generally is more desirable to form the coil with nonuniform inductance per unit length in order to obtain improved band spreading. Thus, the illustrated coil 3 is provided with end portions 7 and 8 having low turn density and correspondingly low inductance per unit length, together with a central portion 9 having relatively high turn density and inductance per unit length.

Energy is transferred to and from one end of the coil by means of a lead 10 which in this instance is in direct conductive engagement with the end portion 7 of the generally helical ribbon 5. An energy transfer element 11 is provided for transferring energy to and from the opposite end portion 8 of the coil 3. While the energy transfer element 11 may assume various forms, it is shown simply as an elongated cylindrical sleeve adapted to be telescopically received over the end portion 8 of the coil 3. In some cases the sleeve 11 might be in direct conductive engagement with the coil 3, but it generally has been found more advantageous to insulate the sleeve from the coil and thereby provide for capacitive energy transfer between the coil and the sleeve. In the illustrated tuner 1, the sleeve 11 is insulated from the coil 3 by means of the insulating layer 6 applied to the coil, but it will be understood that the coil might be insulated from the sleeve by means of a film of dielectric material applied to the interior of the sleeve, or simply by the provision of an air gap between the sleeve and the coil.

Energy is transferred to the sleeve 11 by means of an adjacent energy transfer element 12, which might take various forms, but is illustrated simply as a ring disposed around the sleeve. An insulating air gap 13 is provided between the ring 12 and the sleeve 11 to afford capacitive energy transfer between these elements. A lead 14 is employed to make a conductive circuit connection to the ring 12.

Support for the ring 12 is provided by an insulating plate 15 or the like. An insulating gromet 16 or some other insulating member is provided to support the coil 3.

Provision is made for effecting relative axial movement between the coil 3 and the sleeve 11. In this instance, the sleeve 11 is adapted to be moved by means of a cam 17 mounted on a rotatable shaft 18. The cam is engaged by a ball 19 rotatably carried in an insulating member 20 secured directly to the sleeve 11. A spring 21 is provided to bias the sleeve 11 in one direction and thereby hold the ball 19 against the cam 17. It will be understood that any desired number of cams may be mounted on the shaft 18 to operate other tuners in common with the tuner 1.

When the sleeve 11 is positioned so as to encircle only the extreme outer end 8 of the coil 3, the entire inductance of the coil is effectively connected between the ring 12 and the end lead 10. The coil 3 is resonated by circuit capacitances and the various capacitances between such elements of the tuner as the ring 12, the sleeve 11 and the coil 3. For this position of the sleeve 11, the tuner is at the lower frequency end of its tuning range.

Movement of the sleeve 11 over the coil 3 progressively envelops the coil and diminishes the inductance effectively connected between the ring 12 and the end lead 10. The enveloped portion of the coil is loaded heavily and virtually short circuited by the sleeve. This largely prevents spurious resonances in the inactive portion of the coil. The sleeve 11 also has a detuning effect on the inactive portion of the coil, with the result that any remaining resonances tend to be shifted into frequency ranges remote from the range covered by the tuner.

The tuner 1 may be utilized in a variety of ways.

In the illustrated superheterodyne converter unit 2, the tuner 1$a$ is employed in a radio frequency amplifier stage 22. The tuner 1$a$ is connected to a pair of antenna terminals 23 and 24 by means of an impedance matching network 25 including matching and balancing transformers 26 and 27 having respective primary windings 28 and 29 connected in series between the terminals 23 and 24. The transformer 26 comprises a secondary winding 30 having one end grounded and the other end connected to ground through a balancing capacitor 31. Likewise, the transformer 27 has a secondary winding 32 having one end grounded and its other end connected to the coupling ring 12 of the tuner 1$a$. A balancing capacitor 33 and a trimmer capacitor 34 are connected between the ring 12 and ground.

While the radio frequency amplifier stage 22 may be arranged in a variety of ways, the illustrated amplifier stage includes an electron discharge tube 35 comprising a pair of triodes 36 and 37 having respective cathodes 38 and 39, anodes 40 and 41, and grids 42 and 43. Energy is transferred from the coil 3$a$ to the triode 36 by means of a lead 44 connected between the grid 42 and the end portion 7$a$ of the coil 3$a$. To secure tracking between the various tuners 1, 1$a$, 1$b$, and 1$c$, and adjustable inductance loop 45 is connected in series with the lead 44. A grid resistor 46 is connected between the grid 42 and a terminal 47 which is bypassed to ground by a capacitor 48. A filtering resistor 49 is connected between the terminal 47 and a supply terminal 50 representing a source of automatic gain control voltage.

Energy is coupled from the triode 36 to the triode 37 by means of an inductor 51 connected between the anode 40 of the triode 36 and the cathode 39 of the triode 37. A capacitor 52 and a second inductor 53 are connected in series between the anode 40 and ground. The grid 43 of the triode 37 is bypassed to ground by a capacitor 54 and is connected to the cathode 39 by means of a grid resistor 55.

In the illustrated converter 2, the tuners 1$b$ and 1$c$ are employed to couple the radio frequency amplifier stage 22 to a mixer stage 56. A lead 57 is connected between the anode 41 of the triode 37 and the coil 3$b$ of the tuner 1$b$, an adjustable inductance loop 58 being interposed in series with the lead 57. An aperiodic choke 59 is connected between the anode 41 and a terminal 60 which is bypassed to ground by a capacitor 61. A filtering resistor 62 is connected between the terminal 60 and a terminal 63 representing a source of positive anode potential.

A coupling network 64 is employed to transfer energy between the respective coupling rings 12$b$ and 12$c$ of the tuners 1$b$ and 1$c$. This network 64 comprises a capacitor 65 connected between the rings 12$b$ and 12$c$, together with a pair of capacitors 66 and 67 connected between the respective rings and ground. Trimmer capacitors 68, 69 and 70 are connected in parallel with the respective capacitors 65, 66, and 67.

The illustrated mixer stage 56 comprises a pentode electron discharge tube 71 having a cathode 72, an anode 73, a control grid 74, a screen grid 75, and a suppressor grid 76, the suppressor grid being connected directly to the cathode 72. Energy is transferred from the tuner 1$c$ to the pentode 71 by means of a lead 77 connected between the control grid 74 and the coil 3$c$ of the tuner 1$c$, an adjustable tracking loop 78 being connected in series with the lead 77. In this instance, the cathode 72 is grounded. Resistors 79 and 80 are connected between the grid 74 and ground. Voltage drop across the resistor 80 due to grid rectification may be employed to observe the amount of oscillator excitation and to observe the shape of the RF selectivity curve when the input frequency is swept.

Intermediate frequency energy is transferred from the mixer pentode 71 to an intermediate frequency output terminal 82 by means of a network 83 which comprises a variable inductor 84 connected between the cathode 73 of the pentode 71 and the terminal 85. A resonating capacitor 86 is connected between the terminal 85 and ground. A load resistor 87 is connected between the terminal 85 and a terminal 88 representing a source of positive anode supply voltage. Energy is transferred from the terminal 85 to the terminal 82 by means of a coupling capacitor 89, In the illustrated superheterodyne converter 2, the tuner 1 is employed in a high frequency oscillator 90 provided with an electron discharge triode 91 having a cathode 92, an anode 93, a grid 94, and a cathode heater 95. In this instance the leads 10 and 14, extending to the coil 3 and the ring 12 respectively, are connected to the grid 94 and the anode 93 of the oscillator triode 91. A grid resistor 95$a$ is connected between the grid 94 and ground. Voltage is supplied to the anode 93 by means of an aperiodic choke 96 and a resistor 97 connected in series between the anode and the anode supply terminal 88, a bypass capacitor 98 being connected between the terminal 88 and ground. The cathode 92 of the oscillator triode 91 is grounded, as is one end of the heater 95. The other end of the heater is bypassed to ground through a capacitor 99. A choke 100 is employed to connect the heater to a terminal 101 representing a source of heater voltage.

To transfer energy from the oscillator 90 to the mixer 56, a coupling capacitor 102 is connected between the grid 94 of the oscillator tube 91 and the grid 74 of the mixer pentode 71.

It has been found that the tuner 1 readily covers a wide frequency range, such as the commercial television frequencies between 54 and 216 megacycles, for example. By lengthening the coil and the tuning sleeve, considerably wider tuning ranges can be covered.

Since the tuner 1 does not employ any sliding contact, it does not generate any contact noise. By virtue of the stationary coupling ring 12, both circuit terminals of the tuner are fixed in position.

The direct mechanical engagement between the moving sleeve and its operating cam provides a driving arrangement which is inexpensive yet highly dependable.

Various modifications, alternative constructions, and equivalents may be employed without departing from the true spirit and scope of the invention as disclosed in the drawings and the foregoing description, and as defined in the following claims:

I claim:

1. In a wide range radio frequency tuner, the combination comprising a generally helical coil having a floating end and a terminal end, an elongated conductive sleeve having one end mounted around said coil for telescoping movement over said floating end thereof, means for insulating said coil from said sleeve to provide for capacitive energy exchange therebetween, a conductive ring around said sleeve, means for insulating said ring from said sleeve to provide for capacitive energy exchange therebetween, means for effecting separate circuit connections to said ring and said terminal end of said coil, and means for moving said sleeve through a predetermined axial range relative to said coil and said ring to vary the extent to which said sleeve is telescoped over said coil and thereby vary the effective inductance thereof, said ring being substantially shorter than said sleeve and being disposed at an intermediate point along the range of movement thereof, said sleeve thereby being within said entire ring throughout the range of movement of said sleeve to afford substantially constant capacitance between said ring and said sleeve.

2. In a wide range radio frequency tuner, the combination comprising a generally helical coil having a floating end and a terminal end, an elongated conductive sleeve having one end mounted around said coil for telescoping movement over said floating end thereof, means for insulating said coil from said sleeve to provide for capacitive energy exchange therebetween, a conductive ring around said sleeve, means for insulating said ring from said sleeve to provide for capacitive energy exchange therebetween, means for effecting separate circuit connections to said ring and said terminal end of said coil, and means for moving said sleeve through a predetermined axial range relative to said coil and said ring to vary the extent to which said sleeve is telescoped over said coil and thereby vary the effective inductance thereof, said ring being substantially shorter than said sleeve and being disposed at an intermediate point along the range of movement thereof, said sleeve thereby being within said entire ring throughout the range of movement of said sleeve to afford substantially constant capacitance between said ring and said sleeve, said one end of said sleeve having an internally reduced portion therein disposed around said coil in closely adjacent relation thereto, said sleeve having a portion of internally enlarged diameter relative to said internally reduced portion, said second mentioned portion extending longitudinally away from said internally reduced portion in outwardly spaced relation to said coil for minimizing the loading effect of said sleeve on said coil.

3. In a wide range radio frequency tuner, the combination comprising a generally helical coil having a floating end and a terminal end, an elongated conductive sleeve mounted with one end thereof around said coil for telescoping movement over said floating end thereof, means for insulating said coil from said sleeve to provide for capacitive energy exchange therebetween, a conductive capacitive coupling electrode adjacent the outside of said sleeve, means for insulating said electrode from said sleeve to provide for capacitive energy exchange therebetween, means for effecting separate circuit connections to said electrode and said terminal end of said coil, and means for moving said sleeve through a predetermined axial range relative to said coil and said electrode to vary the extent to which said sleeve is telescoped over said coil and thereby vary the effective inductance thereof, said electrode being substantially shorter in axial extent than said sleeve and being disposed at an intermediate point along the range of movement thereof, said sleeve thereby being opposite substantially all of said electrode throughout the range of movement of said sleeve to afford substantially constant capacitance between said electrode and said sleeve, said sleeve having a first internal portion of substantially greater diameter than said coil and a second internal portion of reduced diameter disposed around said coil in closely adjacent relation thereto, said second portion being disposed at said one end of said sleeve for telescoping movement over said coil, said first portion being spaced outwardly from said coil to minimize the loading effect of said sleeve on said coil.

4. In a wide range radio frequency tuner, the combination comprising a generally helical coil, means for effecting a circuit connection to one end of said coil, an elongated conductive sleeve mounted for telescoping movement over the opposite end of said coil, means for insulating said coil from said sleeve to provide for capacitive energy exchange therebetween, a capacitive coupling electrode adjacent said sleeve, means for insulating said electrode from said sleeve for effecting capacitive energy exchange therebetween, means for effecting a circuit connection to said electrode, and means for moving said sleeve axially relative to said coil and said electrode for varying the effective inductance of said coil, said sleeve having an internally reduced portion at one end thereof and disposed around said coil in closely adjacent relation thereto for telescoping movement over said coil, said sleeve having a second internal portion extending longitudinally away from said internally reduced portion and of a diameter substantially greater than that of said coil for minimizing the loading effect of said sleeve on said coil.

References Cited in the file of this patent

UNITED STATES PATENTS

| | | |
|---|---|---|
| 1,798,012 | Cohen | Mar. 24, 1931 |
| 2,222,644 | Zottu | Nov. 26, 1940 |
| 2,402,443 | Peterson | June 18, 1946 |
| 2,641,708 | Carlson | June 9, 1953 |
| 2,645,718 | Keizer | July 14, 1953 |
| 2,698,387 | Schuster | Dec. 28, 1954 |
| 2,735,072 | Versoy | Feb. 14, 1956 |
| 2,752,494 | Finke | June 26, 1956 |

UNITED STATES PATENT OFFICE

CERTIFICATE OF CORRECTION

Patent No. 2,832,891 April 29, 1958

Harold T. Lyman

It is hereby certified that error appears in the printed specification of the above numbered patent requiring correction and that the said Letters Patent should read as corrected below.

Column 6, list of references cited, under "UNITED STATES PATENTS" insert the following:

| | | |
|---|---|---|
| 2,250,366 | Frisbee | July 22, 1941 |
| 2,477,693 | Guanella | Aug. 2, 1949 |

Signed and sealed this 15th day of July 1958.

(SEAL)
Attest:

KARL H. AXLINE
Attesting Officer

ROBERT C. WATSON
Commissioner of Patents